S. Hutchinson's
Imp'd Harrow & Marker.

No. 117079　　　　PATENTED JUL 18 1871

Witnesses
Harry S. Sprague
Wm. S. Rogers

Inventor
S. Hutchinson
Per Attorney
Thos. S. Sprague

UNITED STATES PATENT OFFICE.

SAMUEL HUTCHINSON, OF GRIGGSVILLE, ILLINOIS.

IMPROVEMENT IN HARROWS AND MARKERS COMBINED.

Specification forming part of Letters Patent No. 117,079, dated July 18, 1871.

*To all whom it may concern:*

Be it known that I, SAMUEL HUTCHINSON, of Griggsville, in the county of Greene and State of Illinois, have invented a new and useful Improvement in a Harrow and Marker; and I do declare that the following is a true and accurate description thereof, reference being had to the accompanying drawing and to the letters of reference marked thereon, and being a part of this specification, in which—

Figure 1:
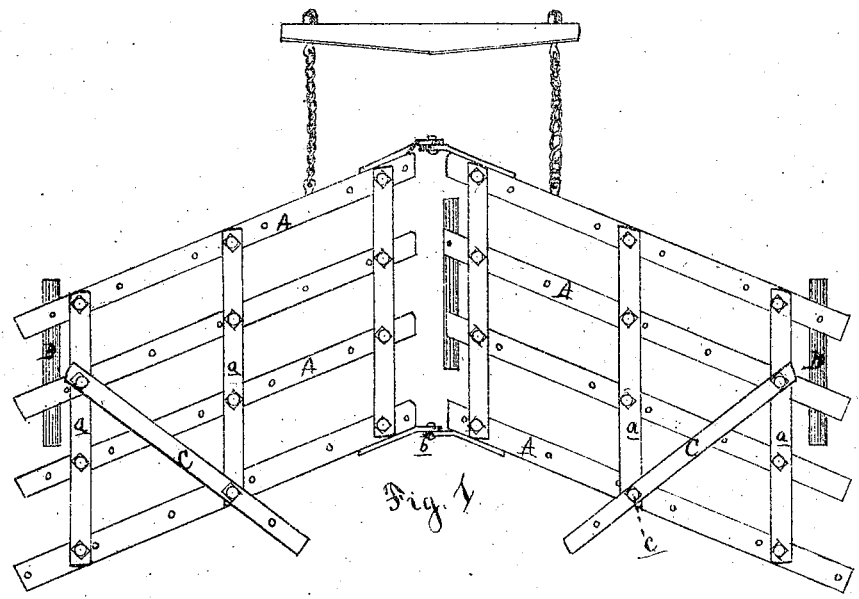
Figure 2:
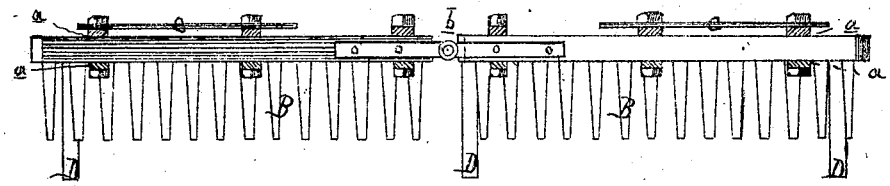
Figure 3:
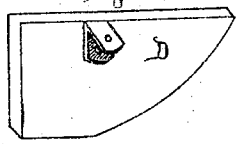

Figure 1 is a plan from the top. Fig. 2 is a rear elevation, and Fig. 3 is a detached view of the marker.

Like letters refer to like parts in each figure.

The nature of this invention relates to the construction of a harrow, and the adaptation thereto of certain shoes or runners that will serve as markers to "lay off" a piece of ground prior to planting. The invention consists of a harrow, the frame of which is so constructed that it can be expanded laterally when it is desired to have the drag-teeth further apart and to harrow a wider space in certain conditions of soil, and be contracted when it is desired to concentrate the drag-teeth and to harrow a narrower space, and in providing for the attachment to the frame of markers, which, in like manner, can be adjusted so as to be the desired distance apart.

In the drawing, A represents the longitudinal bars of my harrow, preferably constructed of wood, in which are securely fastened the drag-teeth B. *a* are metallic slats connecting the bars A, one above and one below, the whole being secured together by proper bolts and forming pivoted joints. The harrow is constructed in two sections or parts, as shown in the drawing, they being pivoted together at *b*, which allows them to adjust themselves to the surface of the ground. C is a brace, pivoted at one end to the outer vertical slats *a*, and is provided at the other end with a series of holes, by which the brace is adjusted to hold the harrow at any angle that may be desired, the brace being rigidly held in place by a proper bolt. D are runners, which are attached to the under side of the harrow by suitable means, in such manner that they will raise the harrow-teeth clear of the ground. These runners are designed to act as markers in the laying off of a field for planting.

What I claim as my invention, and desire to secure by Letters Patent, is—

The harrow, constructed, substantially as above described and shown, with the bars A, the drag-teeth B, the pivoted slats *a*, the adjustable braces C, the pivots *b*, and the detachable marker D, all the several parts constructed, arranged, and operated as described and shown, for the purposes set forth.

SAMUEL HUTCHINSON.

Witnesses:
   S. L. EDUARDS,
   C. F. GIBBS.